United States Patent
Imai et al.

(10) Patent No.: US 11,215,627 B2
(45) Date of Patent: Jan. 4, 2022

(54) AUTOMATIC ANALYZER

(71) Applicants: HITACHI HIGH-TECHNOLOGIES CORPORATION, Tokyo (JP); ROCHE DIAGNOSTICS OPERATIONS, INC., Indianapolis, IN (US)

(72) Inventors: Kenta Imai, Tokyo (JP); Toshiharu Suzuki, Tokyo (JP); Shigeki Matsubara, Tokyo (JP); Takayuki Sugime, Tokyo (JP); Shunsuke Sasaki, Tokyo (JP); Elke Faatz, Huglfing (DE); Beatus Ofenloch-Haehnle, Polling (DE)

(73) Assignees: HITACHI HIGH-TECH CORPORATION, Tokyo (JP); ROCHE DIAGNOSTICS OPERATIONS, INC., Indianapolis, IN (US)

( * ) Notice: Subject to any disclaimer, the term of this patent is extended or adjusted under 35 U.S.C. 154(b) by 306 days.

(21) Appl. No.: 15/756,431

(22) PCT Filed: Jul. 1, 2016

(86) PCT No.: PCT/JP2016/069634
§ 371 (c)(1),
(2) Date: Feb. 28, 2018

(87) PCT Pub. No.: WO2017/038235
PCT Pub. Date: Mar. 9, 2017

(65) Prior Publication Data
US 2018/0246133 A1 Aug. 30, 2018

(30) Foreign Application Priority Data

Sep. 4, 2015 (JP) .............................. JP2015-174285

(51) Int. Cl.
*G01N 35/10* (2006.01)
*G01N 35/00* (2006.01)

(52) U.S. Cl.
CPC ... *G01N 35/1002* (2013.01); *G01N 35/00663* (2013.01); *G01N 35/00693* (2013.01);
(Continued)

(58) Field of Classification Search
CPC ......... G01N 35/1002; G01N 35/00663; G01N 35/00693; G01N 35/1011; G01N 2035/00673
See application file for complete search history.

(56) References Cited

U.S. PATENT DOCUMENTS

2008/0241937 A1  10/2008  Wakamiya et al.
2009/0035867 A1  2/2009  Yagi et al.
(Continued)

FOREIGN PATENT DOCUMENTS

CN  103207282 A   7/2013
JP  1-221671 A   9/1989
(Continued)

OTHER PUBLICATIONS

Extended European Search Report received in corresponding European Application No. 16841267.4 dated Apr. 2, 2019.
(Continued)

*Primary Examiner* — Lore R Jarrett
(74) *Attorney, Agent, or Firm* — Mattingly & Malur, PC

(57) ABSTRACT

In conventional automatic analyzers, there have been instances where, when a plurality of associated items are analyzed as a set item, there is high variation in the analysis data obtained using the set item, leading to a need for improvement of analysis precision. The present invention comprises performing, in mutual association, a set of preparation steps to carry out until it is time to analyze an
(Continued)

unknown sample, the set of preparation steps including a pre-preparation step in which stirring, etc., is performed when an analysis reagent kit is mounted on the analyzer, and a step for correcting a standard curve in which correction samples that correspond to analysis items are used. This makes it possible to perform analysis after the preparation states of a plurality of analysis reagent kits are collected as needed, enabling high-precision analysis of a set item.

2 Claims, 15 Drawing Sheets

(52) U.S. Cl.
CPC ............... *G01N 35/1011* (2013.01); *G01N 2035/00673* (2013.01)

(56) References Cited

U.S. PATENT DOCUMENTS

2009/0142231 A1* 6/2009 Shibuya ........... G01N 35/00594
422/68.1

| 2011/0090066 | A1 | 4/2011 | Yamaguchi et al. |
| 2013/0139616 | A1 | 6/2013 | Yamamoto et al. |

FOREIGN PATENT DOCUMENTS

| JP | 09-072909 A | 3/1997 |
| JP | 2009-036561 A | 2/2009 |
| JP | 2010-175395 A | 8/2010 |
| JP | 2012-32309 A | 2/2012 |
| JP | 2012-098139 A | 5/2012 |
| JP | 2015-129676 A | 7/2015 |

OTHER PUBLICATIONS

International Preliminary Report on Patentability received in corresponding International Application No. PCT/JP2016/069634 dated Mar. 8, 2018.

International Search Report of PCT/JP2016/069634 dated Sep. 27, 2016.

Chinese Office Action received in corresponding Chinese Application No. 201680050350.6 dated Mar. 30, 2020.

* cited by examiner

FIG. 5

| | CONFIRMATION OF SET ITEM REGISTRATION |
|---|---|
| 501 | SET ITEM CAN BE REGISTERED FOR ANALYTICAL REAGENT KIT HIV-AG (PRODUCTION LOT NUMBER 111111) WITH FOLLOWING ANALYTICAL REAGENT KIT AS SET<br>DO YOU WANT TO REGISTER SET ITEM? |

502 — ANALYTICAL REAGENT KIT REGISTERABLE IN SET ITEM

| NAME | PRODUCTION LOT NUMBER | REMARKS FOR REFERENCE |
|---|---|---|
| A-HIV | 111111 | |

503 — REGISTER SET ITEM

NOT REGISTER SET ITEM — 504

FIG. 6

| RELA-TION | REAGENT POSITION | ANALYSIS ITEM NAME | NUMBER OF POSSIBLE MEASUREMENTS | PRODUCTION LOT NUMBER | EXPIRY DATE |
|---|---|---|---|---|---|
| | 1 | TSH | 268 | 000000 | 2016/12 |
| C1 | 2 | HIV-Ag | 300 | 111111 | 2016/10 |
| | 2 | HIV-Ag_c | 300 | 111111 | 2016/10 |
| C1 | 3 | A-HIV | 300 | 111111 | 2016/10 |
| | 3 | A-HIV_c | 300 | 111111 | 2016/10 |
| | 4 | E2 | 150 | 222222 | 2017/02 |
| C2 | 5 | HBeAg | 300 | 333333 | 2017/01 |
| | 5 | HBeAg_c | 300 | 333333 | 2017/01 |
| C3 | 6 | HCV_Ag | 300 | 444444 | 2017/02 |
| | 7 | TnT | 300 | 555555 | 2017/01 |

601 — REGISTERED ANALYSIS ITEM LIST
602, 603, 604

FETCH

DETAILED INFORMATION

FIG. 7

CALIBRATION STATUS LIST

| REAGENT POSITION | ANALYSIS ITEM NAME | CALIBRATION TYPE | REMARKS | CALIBRATION TIME LIMIT |
|---|---|---|---|---|
| 1 | TSH | NORMAL | | 2016/9/31 |
| 2 | HIV-Ag | NORMAL | | 2016/9/30 |
| 2 | HIV-Ag_c | COPY | | 2016/9/15 |
| 3 | A-HIV | NORMAL | | 2016/9/25 |
| 3 | A-HIV_c | COPY | | 2016/9/15 |
| 4 | E2 | NORMAL | EXPIRED | 2016/8/2 |
| 7 | TnT | NORMAL | | 2016/10/5 |

FIG. 10

UNKNOWN SAMPLE MEASUREMENT REQUEST SCREEN

SAMPLE TYPE: SERUM ▽
SAMPLE NUMBER: 10385674

REQUEST ITEM SELECTION

TSH | HIV-Ag | HIV-Ag_c | A-HIV
A-HIV_c

REQUEST

FIG. 11

UNKNOWN SAMPLE MEASUREMENT REQUEST SCREEN

SAMPLE TYPE: SERUM ▽
SAMPLE NUMBER: 10385674

REQUEST ITEM SELECTION

TSH  HIV-Ag  C1 (1101)  A-HIV

DETAILED INFORMATION (1102)
REQUEST

FIG. 14

REGISTERED ANALYSIS ITEM LIST

| RELA-TION | REAGENT POSITION | ANALYSIS ITEM NAME | NUMBER OF POSSIBLE MEASUREMENTS | PRODUCTION LOT NUMBER | EXPIRY DATE |
|---|---|---|---|---|---|
|  | 1 | TSH | 268 | 000000 | 2016/12 |
|  | 2 | HIV-Ag | 1 | 111111 | 2016/10 |
| C1 | 2 | HIV-Ag_c | 1 | 111111 | 2016/10 |
|  | 3 | A-HIV | 50 | 111111 | 2016/10 |
| C1 | 3 | A-HIV_c | 50 | 111111 | 2016/10 |
|  | 4 | E2 | 150 | 222222 | 2017/02 |
|  | 5 | HBeAg | 300 | 333333 | 2017/01 |
| C2 | 5 | HBeAg_c | 300 | 333333 | 2017/01 |
| C3 | 6 | HCV_Ag | 300 | 444444 | 2017/02 |
|  | 7 | TnT | 300 | 555555 | 2017/01 |

1401
1402

FETCH

DETAILED INFORMATION

FIG. 15

REGISTERED ANALYSIS ITEM LIST

| RELA-TION | REAGENT POSITION | ANALYSIS ITEM NAME | NUMBER OF POSSIBLE MEASUREMENTS | PRODUCTION LOT NUMBER | EXPIRY DATE |
|---|---|---|---|---|---|
|  | 1 | TSH | 268 | 000000 | 2016/12 |
|  | 2 | HIV-Ag | 0 | 111111 | 2016/10 |
| C1 | 2 | HIV-Ag_c | 0 | 111111 | 2016/10 |
|  | 3 | A-HIV | 50 | 111111 | 2016/10 |
| C1 | 3 | A-HIV_c | 0 | 111111 | 2016/10 |
|  | 4 | E2 | 150 | 222222 | 2017/02 |
|  | 5 | HBeAg | 300 | 333333 | 2017/01 |
| C2 | 5 | HBeAg_c | 300 | 333333 | 2017/01 |
| C3 | 6 | HCV_Ag | 300 | 444444 | 2017/02 |
|  | 7 | TnT | 300 | 555555 | 2017/01 |

1501  1502

FETCH

DETAILED INFORMATION

AUTOMATIC ANALYZER

TECHNICAL FIELD

The present invention relates to an automatic analyzer for automatically analyzing a specific component contained in a biological sample such as serum and urine, and particularly relates to an automatic analyzer having a configuration for analyzing a plurality of components for one sample.

BACKGROUND ART

In a biological sample analysis on serum, urine or the like, a wide variety of components contained in one sample are analyzed, as publicly known in examinations such as a physical examination and a complete physical examination. For this reason, an automatic analyzer for use in a biological sample analysis can normally measure a plurality of analysis items for one sample by having a configuration for mounting a plurality of analytical reagent kits on the same apparatus, as disclosed in, for example, Patent Document 1. The analytical reagent kit herein represents a set of a plurality of types of reagents necessary for one analysis item. For example, in an immunoanalyzer that performs a luminescence analysis to an antigen assumed as an object to be analyzed using a luminescence labeling substance specifically binding to the antigen to be analyzed, three types of reagents, that is, a labeled antibody reagent, a biotinylated antibody reagent, and a streptavidin bond magnetic particle reagent are often used as one analytical reagent kit.

In recent years, the number of cases of performing an analysis of calculated values obtained from analysis data on a plurality of interrelated analysis items as additional items in addition to an analysis of the plurality of interrelated analysis items as individual items has increased for purposes of grasping a health condition and a disease state of a subject being tested in more detail. Such additional items will be referred to as set item, hereinafter. For example, in an examination of hepatitis B or human immunodeficiency virus (HIV), an amount of antigen/amount of antibody ratio calculated from amounts of a plurality of types of antigens and antibodies in a sample is assumed as one object to be analyzed (set item), and not only an analysis as to whether a subject is infected but also a detailed analysis of a disease state at timing of the examination (for example, a transitional period from infection) is performed.

PRIOR ART DOCUMENT

Patent Document

Patent Document 1: JP-2012-98139-A

SUMMARY OF THE INVENTION

Problem to be Solved by the Invention

When an analysis is performed with a plurality of related items used as a set item in a conventional automatic analyzer, analysis data obtained in the set item varies widely and it is often necessary to improve analysis precision. The inventors of the present invention conducted a survey on this cause and reached a conclusion that the analysis data on the set item varies widely if a plurality of analytical reagent kits that constitute the set item conspicuously differ in preparatory state. Preparation of the analytical reagent kit means herein a series of preparatory processes executed until an analysis of an unknown sample is performed, for example, a preliminary preparation process such as stirring executed when the analytical reagent kit is mounted on the analyzer and a calibration curve calibration process using a calibration sample corresponding to each analysis item. If the plurality of analytical reagent kits that constitute the set item are prepared by different parameters, the analytical reagent kits differ in state. In such a state, biases in different directions are generated in data on the individual analysis items; as a result, the analysis data obtained for the set item as calculated values often varies widely. It was confirmed, for example, that a variation in an analysis result as the set item increases when the analytical reagent kits greatly differ in preliminary preparation operation execution timing or final calibration execution timing.

Means for Solving the Problem

To solve the above problem, the present invention provides an automatic analyzer capable of executing an analysis of a set item upon making uniform preparatory states of a plurality of analytical reagent kits used for the analysis of the set item as needed. In other words, an automatic analyzer presented by the present invention is characterized by managing the preparatory states of the plurality of analytical reagent kits to be interrelated with one another. The automatic analyzer presented by the present invention is also characterized in that managing the preparatory states of the plurality of analytical reagent kits to be interrelated with one another makes it possible to suppress a user from performing unnecessary additional work or backtracking work in the analysis of the set item.

Effect of the Invention

It is possible to realize an automatic analyzer capable of executing an analysis of a set item with high precision by applying the present invention. As a consequence, it is possible to perform an analysis of higher value that enables a user to obtain more detailed information about a health condition and a disease state of a subject being tested.

BRIEF DESCRIPTION OF THE DRAWINGS

FIG. 5 shows an example of an input screen when a user manually inputs a determination in the analytical reagent kit registration step in the automatic analyzer to which the present invention is applied.

FIG. 6 shows an example of a screen for displaying a list of information about analytical reagent kits completed with the analytical reagent kit registration step in the automatic analyzer to which the present invention is applied.

FIG. 7 shows an example of a calibration status list display screen for displaying a list of information about analytical reagent kits completed with a calibration curve calibration step in the automatic analyzer to which the present invention is applied.

FIG. 10 shows an example of a screen for a user to set request items to an unknown sample in an unknown sample measurement step in the automatic analyzer to which the present invention is applied.

FIG. 11 shows another example of the screen for the user to set request items to the unknown sample in the unknown sample measurement step in the automatic analyzer to which the present invention is applied.

FIG. 14 shows an example of a registered analysis item list display screen when the number of possible measurements of one analytical reagent kit that constitutes the set item is one in the automatic analyzer to which the present invention is applied.

FIG. 15 shows an example of the registered analysis item list display screen when the number of possible measurements of one analytical reagent kit that constitutes the set item is zero in the automatic analyzer to which the present invention is applied.

MODES FOR CARRYING OUT THE INVENTION

A preferred embodiment of an automatic analyzer for carrying out the present invention will be described hereinafter.

Figure 1:
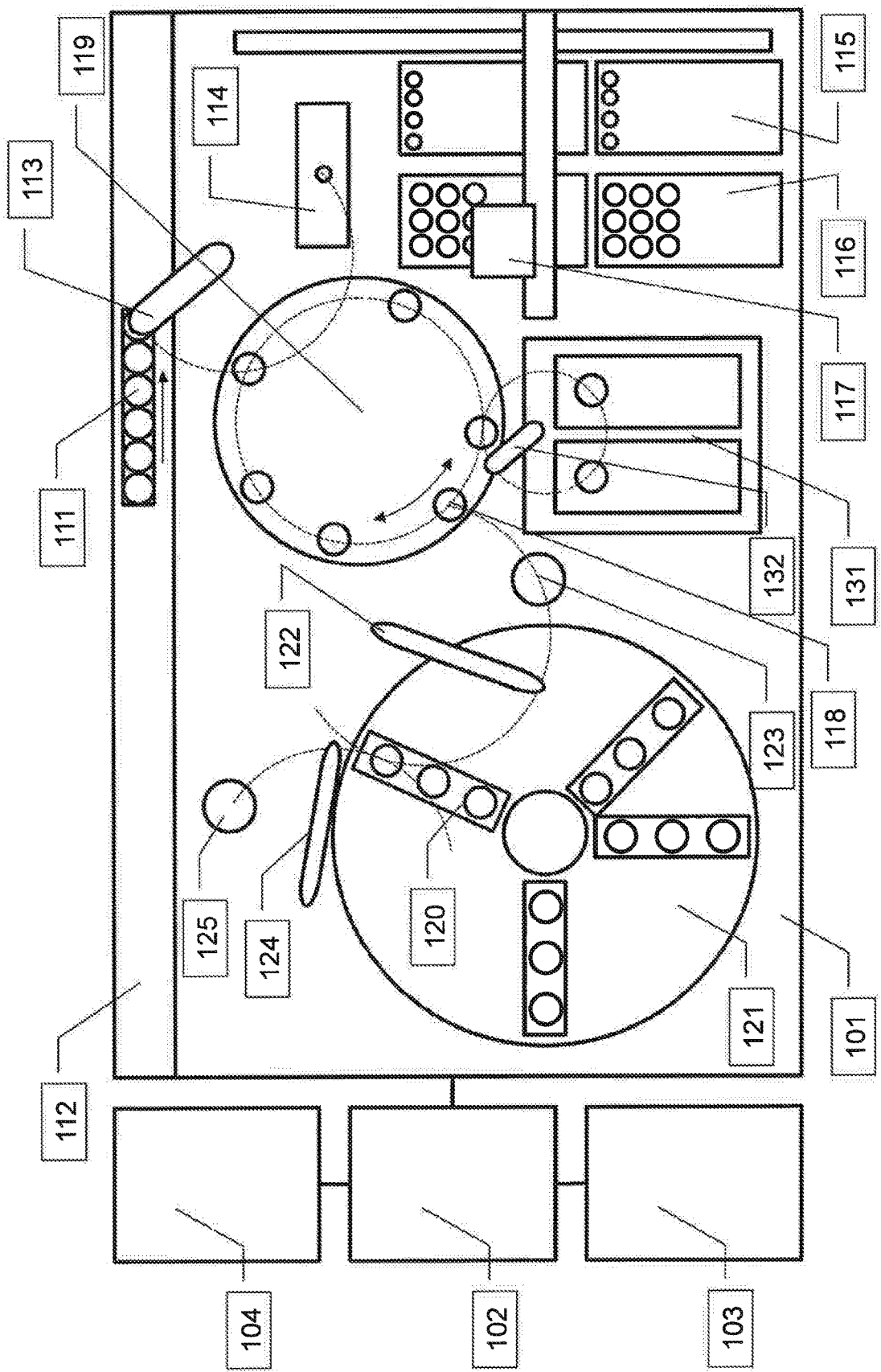
FIG. 1 is a schematic diagram of an automatic analyzer to which the present invention is applied while an immunoanalyzer performing a luminescence analysis of an antigen as an object to be analyzed using a luminescence labeling substance specifically binding to the antigen to be analyzed is taken by way of example.

FIG. 1 is a schematic diagram of an automatic analyzer to which the present invention is applied while an immunoanalyzer performing a luminescence analysis of an antigen as an object to be analyzed using a luminescence labeling substance specifically binding to the antigen to be analyzed is taken by way of example. The present automatic analyzer is configured with an analysis section 101 that performs an analysis operation, a control section 102 that controls the automatic analyzer, an input section 103 to which a user inputs information, and a display section 104 that displays information to the user. It is noted that the input section 103 and the display section 104 may be an integrated section, an example of which is a touch panel monitor. The analysis section 101 in the present automatic analyzer includes a sample container transport mechanism 112 for transporting a sample container 111 containing a sample to a sample splitting position, a sample probe 113 for dispensing the sample, a disposable tip attachment/detachment section 114 for attaching/detaching a disposable tip for the sample probe to/from the sample probe, a disposable tip magazine 115 for supplying the disposable tip, a reaction container magazine 116 for supplying a reaction container, a disposable tip/reaction container transport mechanism 117 for transporting the disposable tip and the reaction container, a reaction container holding section 119 having a plurality of opening portions 118 each of which can hold a reaction solution in the reaction container at a constant temperature, a measurement reagent disk 121 having a region for holding a plurality of analytical reagent kits 120 each containing an analytical reagent, a reagent dispensing probe 122 for dispensing the analytical reagent into the reaction container holding section, a reagent probe washing section 123 for washing the reagent dispensing probe with water or a wash solution, a magnetic particle stirring mechanism 124 for stirring the analytical reagent containing magnetic particles before dispensation, a magnetic particle stirring mechanism washing section 125 for washing the magnetic particle stirring mechanism with water or a wash solution, a detection section 131 for performing luminescence detection, and a detection-section reaction container transport mechanism 132 for transporting the reagent container to the detection section. A plurality of bottles including a spare bottle for supplying each of common reagents such as a measurement buffer, the wash solution, and a probe wash solution are stored within the analyzer, and each reagent is supplied to each mechanism through a reagent tube inserted into each bottle.

An outline of an analysis process executed in the automatic analyzer will next be described. First, the reaction container from the reaction container magazine 116 is installed in the reaction container holding section. In addition, the analytical reagent containing magnetic particles is stirred by the magnetic particle stirring mechanism 124 to suspend the magnetic particles in the reaction container. Next, the analytical reagent containing magnetic particles is dispensed into the reaction container by the reagent dispensing probe 122 to be mixed with the reaction solution, and a reaction is produced for certain time. Subsequently, the sample container 111 containing the sample is transported to the sample splitting position by the sample container transport mechanism 112, and the sample is dispensed into the reaction container on the reaction container holding section by the sample probe 113 to which the disposable tip is attached by the disposable tip attachment/detachment section 114. The solution in the reaction container is then transported to the detection section by the detection-section reaction container transport mechanism 132, and a luminescence reaction is produced in the detection section. An analysis result calculated by luminescence data is displayed on the display section 104.

Figure 2:
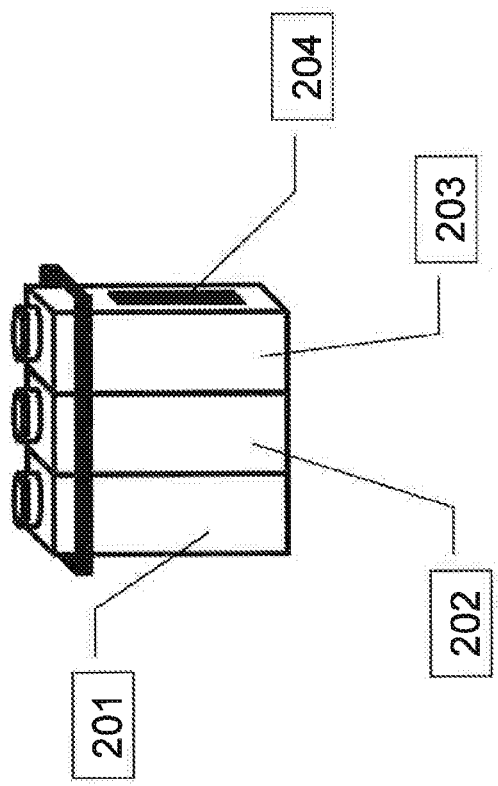
FIG. 2 is a schematic diagram showing a configuration of an analytical reagent kit used in the automatic analyzer to which the present invention is applied.

FIG. 2 is a schematic diagram showing a configuration of an analytical reagent kit 120 used in the automatic analyzer according to the present embodiment. The analytical reagent kit 120 is mainly configured with a labeled antibody reagent container 201 containing a labeled antibody reagent, a biotinylated antibody reagent container 202 containing a biotinylated antibody reagent, and a streptavidin bond magnetic particle reagent container 203 containing a streptavidin bond magnetic particle reagent. Furthermore, an analytical reagent label 204 such as a barcode or an RFID including analytical reagent kit information about the analytical reagent kit such as an analysis item, a production lot number, an analytical reagent kit number, the number of possible measurements, a storage time limit, an expiration date after mounted on the analyzer, a calibration valid period after calibration, and factory default calibration data is affixed to the analytical reagent kit 120.

Figure 3:
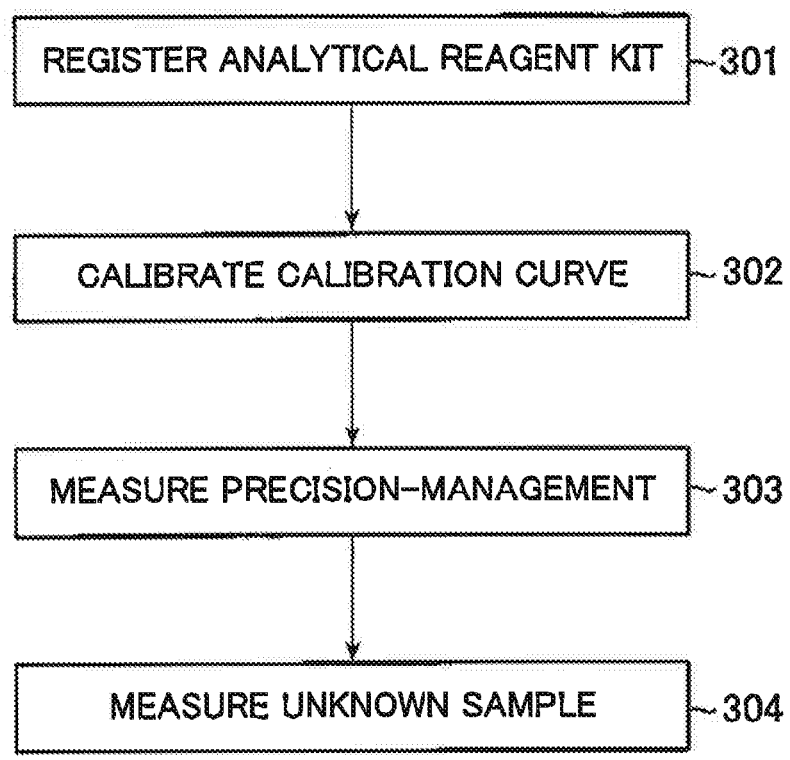
FIG. 3 shows an outline of a process since the analytical reagent kit is mounted on the automatic analyzer to which the present invention is applied until an analysis of an unknown sample measurement is executed.

FIG. 3 shows an outline of a process since the analytical reagent kit 120 is mounted on the automatic analyzer until an analysis of an unknown sample measurement is executed. The present process is configured with an analytical reagent kit registration step 301 of mounting the analytical reagent kit 120 on the automatic analyzer, registering the analytical reagent kit 120 to the automatic analyzer, and performing a preliminary preparation operation such as a reagent capacity check and preliminary stirring of the magnetic particle reagent, a calibration curve calibration step 302 of calibrating a calibration curve for each analysis item set to the analytical reagent kit 120 by measuring a calibration sample at a known concentration by the analytical reagent kit 120, an precision-management measurement step 303 of confirming validity of the calibration curve by measuring a precision-managed measurement sample managed to have a concentration within a certain concentration range by the analytical reagent kit 120, and an unknown sample measurement step 304 of analyzing an unknown sample on the basis of analysis data and the calibration curve by measuring an unknown sample by the analytical reagent kit 120 in response to an analysis request. By executing these steps 301 to 304, an analysis of the unknown sample is executed using the analytical reagent kits 120 mounted on the automatic analyzer.

The analytical reagent kit registration step 301 in the automatic analyzer according to the present embodiment will now be explained with reference to FIGS. 4 to 6. Attention is paid here, in particular, to an analysis data variation that occurs when a plurality of analytical reagent kits that constitute a set item greatly differ in preliminary preparation operation timing. In other words, means capable of suppressing the analysis data variation resulting from the preliminary preparation execution timing by collectively executing the preliminary preparation operation at timing at which all the analytical reagent kits that constitute one set item are present will be described.

Figure 4:
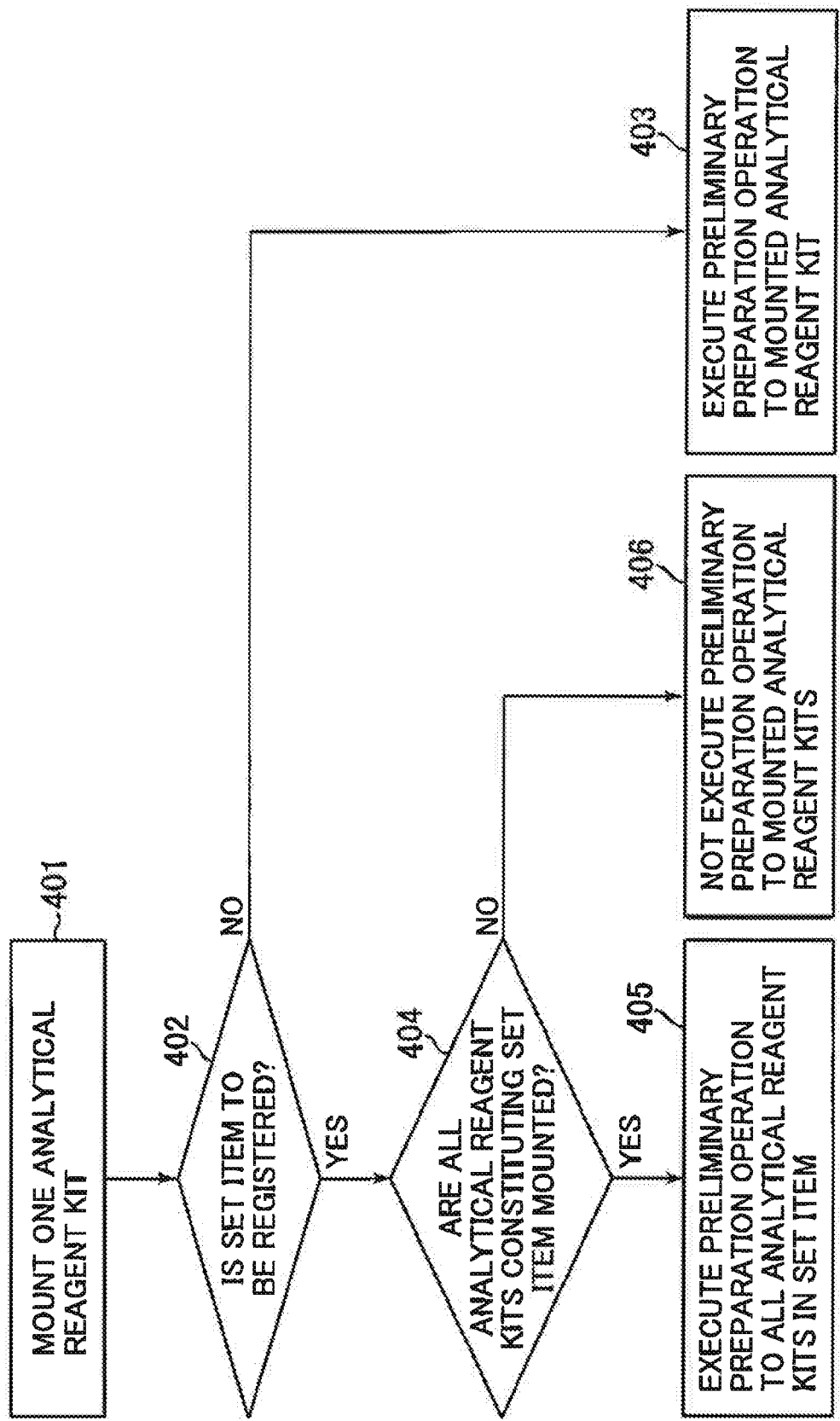
FIG. 4 shows processes in an analytical reagent kit registration step in the automatic analyzer to which the present invention is applied.

FIG. 4 shows processes in the analytical reagent kit registration step 301 in the automatic analyzer according to the present embodiment.

Step 401 is a step of user's mounting the analytical reagent kit on the automatic analyzer. When the analytical reagent kit 120 is registered to the automatic analyzer, the user first mounts the analytical reagent kit 120 in the measurement reagent disk 121 of the automatic analyzer and then processing goes to Step S402.

Step 402 is a step of determining whether the analytical reagent kit 120 is planned to be used as a set item. This determination step is either executed automatically by the automatic analyzer on the basis of information of the analytical reagent label 204 affixed to the analytical reagent kit 120 or executed manually by user's inputting a determination to the automatic analyzer.

When the automatic analyzer automatically executes the determination, an automatic determination is executed on the basis of the information about the analytical reagent kit 120 described in the analytical reagent label 204. In other words, the user sets a condition that the analytical reagent kit 120 is used as the set item to the automatic analyzer in advance, and the automatic determination is executed on the basis of this setting condition and the information described in the analytical reagent label 204. When the user manually inputs the determination, the automatic analyzer displays a screen for the user to input whether the analytical reagent kit 120 is planned to be used as the set item on the display section 104 on the basis of the analysis item to be analyzed by the analytical reagent kit 120 described in the analytical reagent label 204. FIG. 5 shows an example of this input screen. The present example of the input screen includes a set item registration confirmation message display section 501 that shows that the analytical reagent kit can be used as the set item, a set analytical reagent kit information display section 502 that shows information about the analytical reagent kit that can be registered as the set item, and a set item registration button 503 and a set item non-registration button 504 for user to input whether to register the analytical reagent kit as the set item. Whether to register the analytical reagent kit displayed in the set analytical reagent kit information display section 502 can be determined by user's depressing the set item registration button 503 or the set item non-registration button 504.

When it is determined that the analytical reagent kit is not registered as the set item in Step 402, the analytical reagent kit is handled as an individual item and the preliminary preparation operation such as the reagent capacity check and the preliminary stirring of the magnetic particle reagent is executed individually (Step 403). When it is determined that the analytical reagent kit is registered as the set item, the processing goes to Step 404 to be explained next.

Step 404 is a step of determining whether all the analytical reagent kits registered as the set item are mounted on the automatic analyzer. It is appropriate for the automatic analyzer to automatically execute the present determination on the basis of the set item registration determined in Step 402. When the analytical reagent kits 120 registered as the set item are all mounted on the automatic analyzer, the processing goes to Step 405. When one or more of the analytical reagent kits 120 registered as the set item are not mounted on the automatic analyzer, the processing goes to Step 406.

Step 405 is a step of executing the preliminary preparation operation such as the reagent capacity check and the preliminary stirring of the magnetic particle reagent to all the analytical reagent kits 120 registered as the set item. By completing the preliminary preparation operation, the registration step of these analytical reagent kits 120 is completed and the analytical reagent kits 120 turn into a state of being available in the next calibration curve calibration step. By collectively executing the preliminary preparation operation to all the analytical reagent kits at timing of registering the analytical reagent kits as the set item, the preparatory states of these analytical reagent kits can be made uniform. It is, therefore, possible to obtain analysis data with high precision for the set item.

Step 406 is a step of ending the analytical reagent kit registration step without executing the preliminary preparation such as the reagent check and the preliminary stirring of the magnetic particle reagent when one or more analytical reagent kits 120 registered as the set item are not mounted on the automatic analyzer. In this case, the preliminary preparation operation is not executed to the analytical reagent kits. Owing to this, even when the registration process is over, the analytical reagent kits do not turn into a state of being available in the calibration step.

As shown in the set analytical reagent kit information display section 502, it is more appropriate to add, as the condition for determining whether to register each analytical reagent kit as the set item, information about production time of the analytical reagent kit such as the production lot number and the storage time limit as well as the analysis item to be analyzed by the analytical reagent kit. By adding the information about the production time of the analytical reagent kit, it is possible to make uniform the transitional periods after manufacturing of a plurality of analytical reagent kits that constitute the set item as well as the timing of the preliminary preparation operation. It is, therefore, possible to obtain the analysis data with higher precision for the set item. It is quite appropriate, in particular, for all the analytical reagent kits that constitute one set item to have the same production lot number since this can facilitate user's handling.

Furthermore, some analytical reagent kits may be used not as individual items but only as the set item. If such an analytical reagent kit is registered and the automatic analyzer is configured to automatically execute the determination, the processing described above has no change. However, with the configuration of the user's manual determination, it is appropriate that contents of the set item registration confirmation message display section 501, the set analytical reagent kit information display section 502, the set item registration button 503, and the set item non-registration button 504 shown in FIG. 5 are changed to contents to the effect that the user is notified of information about the other analytical reagent kit constituting the set item.

FIG. 6 shows an example of a registered analysis item list display screen for displaying a list of information about analytical reagent kits 120 completed with the analytical reagent kit registration step 301. An analytical reagent kit status display list 601 shown in the present example includes relation display columns for displaying each related item, reagent position display columns for displaying a position of each analytical reagent kit 120 on the measurement reagent disk 121, analysis item name display columns for displaying a name of an analysis item to be analyzed by each analytical reagent kit 120, number-of-possible-measurements display columns for displaying a remaining number of measurements executable using each analytical reagent kit 120, production lot number display columns for displaying the production lot number of each analytical reagent kit 120, and expiry date display columns each showing a storage expiry date of the analytical reagent kit 120.

Rows 602 show screen display when the set item registration is completed while a case in which an analytical reagent kit with an HIV antigen (HIV-Ag) as an analysis item and an analytical reagent kit with an HIV antibody (A-HIV) as an analysis item are completed with registration as a set item is taken by way of example. In this case, analysis items (denoted by HIV-Ag_c and A-HIV_c in the present example) used for the set item are added in addition to individual analysis items, and relations (denoted by C1 in the present example) of these items are displayed.

Rows 603 show a screen display example when set item registration is uncompleted while a case in which an analytical reagent kit with a hepatitis b envelope antigen (HBeAg) as an analysis item has been registered as a set item but another related item is not completed with registration is taken by way of example. In this case, an analysis item used (denoted by HBeAg_c in the present example) as the set item is added to display the presence of the other related item (denoted by C2 in the present example). However, the other related item is not completed with registration and the preliminary preparation operation to the analytical reagent kit is not, therefore, completed. Owing to this, it is displayed that the analysis item using this analytical reagent kit is not in an available state. In the present screen example, displaying rows 603 in a different color indicates that the analytical reagent kit is not in an available state. It is noted that the state in which the analytical reagent kit is not available can be also shown by displaying characters in a different color or by additionally displaying available/unavailable display columns for displaying whether the analytical reagent kit is available.

Row 604 shows a display example when an analytical reagent kit with a hepatitis C antigen (HCV_Ag) as an analysis item and for use only as a set item is completed with registration but the other related item is not completed with registration. In this case, the presence of the other related item (denoted by C3 in the present example) is displayed and it is displayed that an analysis item using this analytical reagent kit is not in an available state (being unavailable is shown by displaying the row in a different color in the present example).

Features of the calibration curve calibration step 302 in the automatic analyzer according to the present embodiment will now be explained with reference to FIGS. 7 and 8. First, attention is paid to the fact that an individual analysis item measured by one analytical reagent kit is identical to one analysis item that constitutes a set item in calibration condition, and that there is, therefore, no need to perform calibration for the respective analysis items. The automatic analyzer according to the present embodiment can save time and labor for performing unnecessary calibration work by reusing a calibration result of the individual analysis item as a calibration result of the analysis item that constitutes the set item. Furthermore, in the present step, attention paid to an analysis data variation that occurs when a plurality of analytical reagent kits that constitute the set item greatly differ in calibration curve calibration timing. The automatic analyzer according to the present embodiment can set different calibration time limits between the individual analysis item measured by one analytical reagent kit and the analysis item that constitutes the set item. It is thereby possible to set shorter the calibration time limit of the analysis item that constitutes the set item and suppress the analysis data variation resulting from a difference in the calibration curve calibration timing for the plurality of analytical reagent kits.

FIG. 7 shows an example of a calibration status list display screen for displaying a list of information about the analytical reagent kits 120 completed with the calibration curve calibration step 302. A calibration status display list 701 shown in FIG. 7 includes reagent position display columns for displaying a position of each analytical reagent kit 120 on the measurement reagent disk 121, analysis item name display columns for displaying a name of each analysis item to be analyzed, calibration type display columns for displaying a type of each calibration, remarks display columns for displaying special notes about each calibration, and calibration time limit display columns for displaying a time limit of each calibration.

Rows 702 show screen display after completion of calibration while a case in which the analytical reagent kit with the HIV antigen (HIV-Ag) as the analysis item and the analytical reagent kit with the HIV antibody (A-HIV) as the analysis item are completed with calibration as the set item is taken by way of example. In this case, calibration results of the analysis items (HIV-Ag_c and A-HIV_c) constituting the set item are copied from the individual calibration results of the analysis items (HIV-Ag and A-HIV), respectively. This is because each analysis item that constitutes the set item and each of the individual analysis item are equal in all of the analytical reagent kit, a calibration sample, a calibration condition such as a measurement condition used for the calibration. In other words, there is no need to additionally execute calibration to the analysis items that constitute the set item if calibration is executed to the individual analysis items. Furthermore, in the present screen example, displaying rows in each of which a copied calibration result is reused in a different color makes it possible to explicitly show and to make the user easily grasp that the copied calibration result is reused. Copying the calibration result as shown in the present example makes it possible to save time and labor for the user to perform unnecessary calibration work. It is noted that copying mentioned herein indicates not only posting data on the calibration result of each of the individual analysis item in calibration result data on each analysis item that constitutes the set item but also referring to single calibration result data for the individual analysis item and the analysis item that constitutes the set item. Whichever means indicated by copying equally contributes to attaining the effect of the present invention that unnecessary calibration work can be reduced.

Moreover, as shown on calibration time limit display 703, the automatic analyzer shown in the present example can set different calibration time limits between each of the individual analysis items and each analysis item that constitutes the set item when the calibration result is copied. This setting can be executed by inputting a calibration valid period of the set item in addition to a calibration valid period of each of the individual items to the analytical reagent label 204 of each analytical reagent kit 120 or to the automatic analyzer. Setting the shorter calibration time limit to the set item makes it possible to reduce the difference in calibration timing among the analysis items that constitute the set item and to obtain analysis data with higher precision for the set item.

Figure 8:
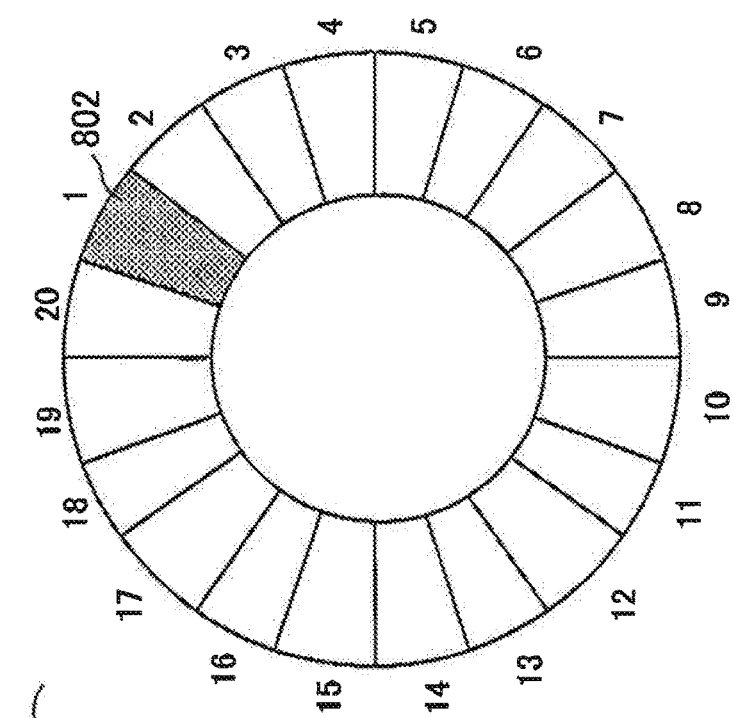
FIG. 8 shows an example of a screen for displaying a list of statuses of reagents mounted on the automatic analyzer, in the automatic analyzer to which the present invention is applied.

Furthermore, FIG. 8 shows a reagent status display screen for displaying a list of reagent statuses. The automatic analyzer shown in the present embodiment can also display a registration state of the set item and a copy state of the calibration result on the present screen. A reagent disk information display section 801 schematically shows states of the analytical reagent kits 120 mounted in the measurement reagent disk 121. In the present embodiment, a display example for the automatic analyzer that can mount a total of 20 analytical reagent kits 120 is shown. When the user selects an analytical reagent kit display section 802 in the reagent disk information display section 801, an analytical reagent kit detailed information display screen 803 for displaying detailed information about the analytical reagent kit 120 is displayed. The analytical reagent kit detailed information display screen 803 according to the present embodiment includes a general information display section 804 for displaying general regent information such as the name of the analysis item to be analyzed by each analytical reagent kit and the number of possible measurements of the analytical reagent kit, and a calibration status display section 805 for displaying information about a calibration status. As for the analytical reagent kit 120 registered as the set item, a name of the analysis item used for the set item in addition to the name of the individual analysis item is displayed in the general information display section 804. Moreover, calibration type information 806, 807 indicating whether the copied calibration result 807 is reused as well as the expiry date of calibration is displayed in the calibration status display section 805. The reagent status display screen shown in the present example enables the user to grasp and manage the registration status of each set item and a copy status of each calibration result more easily.

Features of the precision-management measurement step 303 in the automatic analyzer according to the present embodiment will now be explained with reference to FIG. 9. First, similarly to the calibration curve calibration step 302, when a precision-management measurement condition for the individual analysis item measured by one analytical reagent kit is identical to that for each analysis item that constitutes the set item, the automatic analyzer according to the present embodiment reuses a precision-management measurement result of the individual analysis item as a precision-management measurement result of the analysis item that constitutes the set item. It is thereby possible to save time and labor for performing unnecessary precision-management measurement work, similarly to the calibration curve calibration step 302. Furthermore, when a precision-management measurement of one analysis item that constitutes the set item is a failure, the automatic analyzer according to the present embodiment can determine that precision-management measurements of the other analysis items that constitute the set item are failures. It is thereby possible to manage precision of the set item more precisely and obtain analysis data with higher precision.

Figure 9:
FIG. 9 shows an example of a screen for displaying a list of information about analytical reagent kits completed with a precision-management measurement step in the automatic analyzer to which the present invention is applied.

FIG. 9 shows a precision-management measurement status list display screen for displaying a list of information about the analytical reagent kits 120 completed with the precision-management measurement step 303. A precision-management measurement status display list 901 shown in FIG. 9 includes analysis item name display columns for displaying each analysis item name, precision-managed sample name display columns for displaying a name of each precision-managed sample, precision-managed sample type display columns for displaying a type of each precision-managed sample, production lot number display columns for displaying a production lot number of each precision-managed sample, and remarks display columns for displaying special notes about each precision-management measurement.

Rows 902 show screen display after completion of the precision-management measurement while a case in which the analytical reagent kit with the HIV antigen (HIV-Ag) as the analysis item and the analytical reagent kit with the HIV antibody (A-HIV) as the analysis item are completed with the precision-management measurement as the set item is taken by way of example. In this case, precision-management measurement results of the analysis items (HIV-Ag_c and A-HIV_c) constituting the set item are copied from the individual precision-management measurement results of the analysis items (HIV-Ag and A-HIV), respectively. This is because each analysis item that constitutes the set item and each of the individual analysis item are equal in all of the analytical reagent kit, the calibration sample, and the measurement condition used for the precision-management measurement. In other words, there is no need to additionally execute precision-management measurement to the analysis items that constitute the set item if precision-management measurement is executed to the individual analysis items. Furthermore, in the present screen example, displaying rows in each of which a copied precision-management measurement result is reused in a different color makes it possible to explicitly show and to make the user easily grasp that the copied precision-management measurement result is reused. Copying the precision-management measurement result as shown in the present example makes it possible to save time and labor for the user to perform unnecessary precision-management measurement work.

Furthermore, the present screen example includes a precision-management error criterion selection button 903 that select whether to determine that, in measuring one precision-managed sample, when a non-normal result is obtained for at least one analysis item among the plurality of analysis items registered as the set item, precision-management measurements of all the analysis items that constitute the set item are errors or only the precision-management measurement of the analysis item is an error. The automatic analyzer often continuously executes the calibration and the precision-management measurement by continuously placing the calibration sample and the precision-managed sample into the automatic analyzer. In the present process, a function provided by this precision-management error criterion selection button 903 can be similarly executed. Providing such selection means makes it possible to manage the precision-management measurement of the set item more precisely and obtain analysis data with higher precision for the set item.

Features of the unknown sample measurement step 304 in the automatic analyzer according to the present embodiment will now be explained with reference to FIGS. 10 to 13. The automatic analyzer according to the present embodiment can save time and labor for the user to perform backtracking work due to erroneous analysis by notifying the user of a user's request error before start of the analysis when the user executes an erroneous set item analysis request.

FIG. 10 shows an example of an unknown sample measurement request screen for the user to set request items to an unknown sample in the unknown sample measurement step 304. The unknown sample measurement request screen in the present embodiment includes a sample type input section 1001 for inputting a type such as serum of each sample, a sample number input section 1002 for inputting an ID of each sample, a request item selection section 1003 for selecting an item to be requested to the unknown sample, and a request enter button 1004 for entering an input content for the unknown sample. In the request item selection section 1003 in the present embodiment shows that an item is selected as a request item by displaying a character string and a peripheral part in boldface type as shown in, for example, thyroid-stimulating hormone (TSH) denoted by a selection item 1005.

In the present example, HIV-Ag_c denoted by a selection item 1006 and A-HIV_c denoted by a selection item 1007 are registered as one set item. In the present example, when the user selects the selection item 1006 or the selection item 1007 that is one of the selection items that constitute the set item, the unselected selection item is automatically selected. Furthermore, when the user deselects the selection item 1006 or the selection item 1007, the non-deselected selection item is automatically deselected. Automatically selecting or deselecting the set item as described above makes it possible to prevent the user from forgetting about requesting one of the selection items. In the present example, a case in which the remaining selection item is selected or deselected upon selecting or deselecting one of the selection items that constitute the set item is shown. It is also appropriate to automatically request the unselected selection item when one or more of the selection items that constitute the set item at a stage of user's depressing the request enter button 1004.

Figure 12:
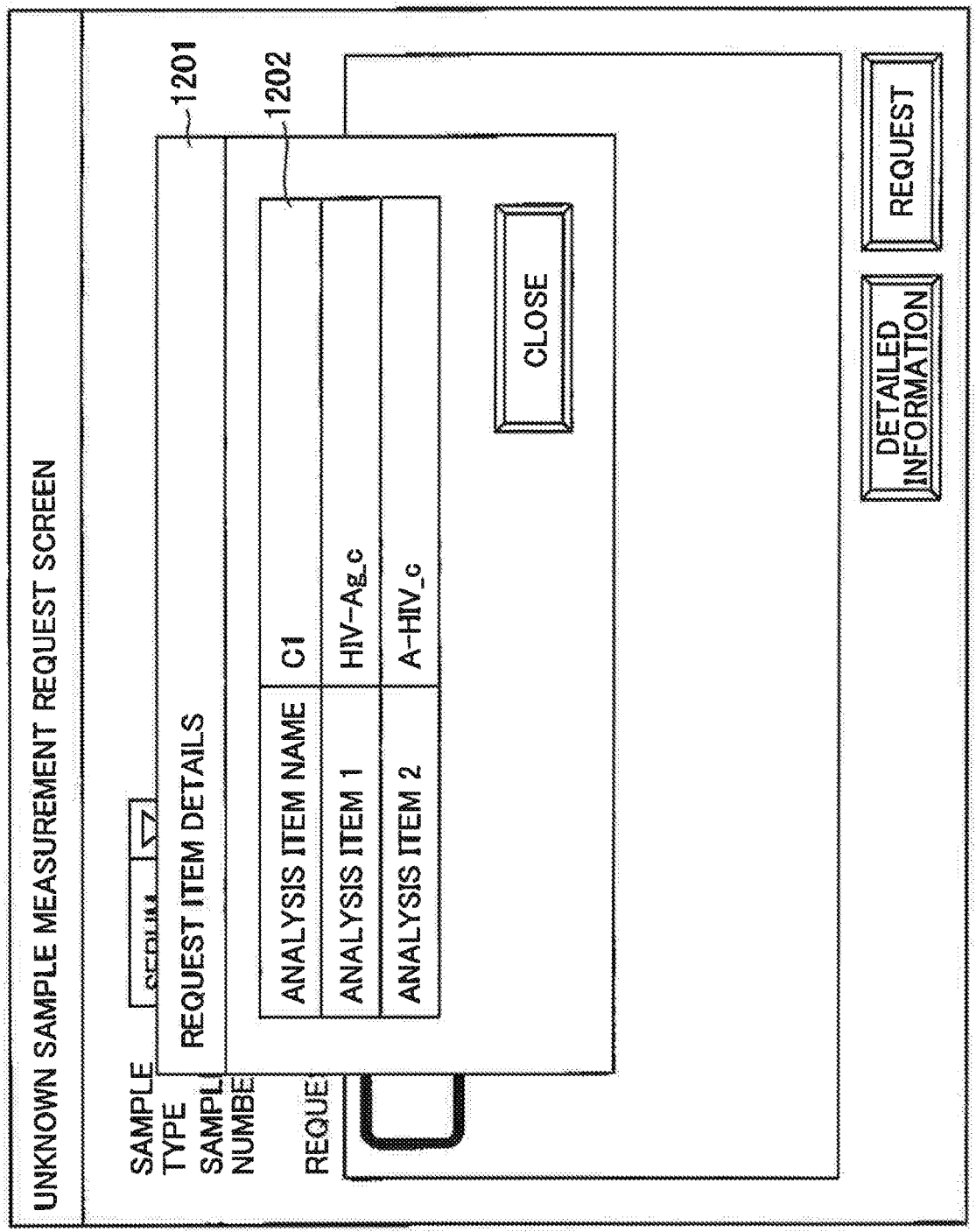
FIG. 12 shows an example of a screen for obtaining detailed information about each analysis item that constitutes the set item in the unknown sample measurement step in the automatic analyzer to which the present invention is applied.

FIG. 11 shows another example of the unknown sample measurement request screen for the user to set request items to the unknown sample in the unknown sample measurement step 304. In the previous screen example, a method of selecting each analysis item that constitutes one set item in the request item selection section 1003 is shown. On the other hand, in the present example, a method of selecting the name of the set item as denoted by a selection item 1101 in the request item selection section 1003 is shown. In the present example, a content described in the relation display columns on the registered analysis item list display screen described above is used as this name of the set item. The name may be made freely changeable to facilitate user's discrimination. Furthermore, it is more appropriate that the unknown sample measurement request screen includes a detailed information display button 1102 for obtaining detailed information about each analysis item that constitutes the set item with such a method of selecting the name of the set item. For example, as shown in FIG. 11, when the user selects the detailed information display button 1102 in a state of selecting a set item to be made active, then an analysis item detailed information display screen 1201 shown in FIG. 12 is displayed, and detailed information about each analysis item that constitutes the set item is obtained as shown in a table 1202. With such a screen, similarly to the above example, the user can manage and use the set item more easily.

Figure 13:
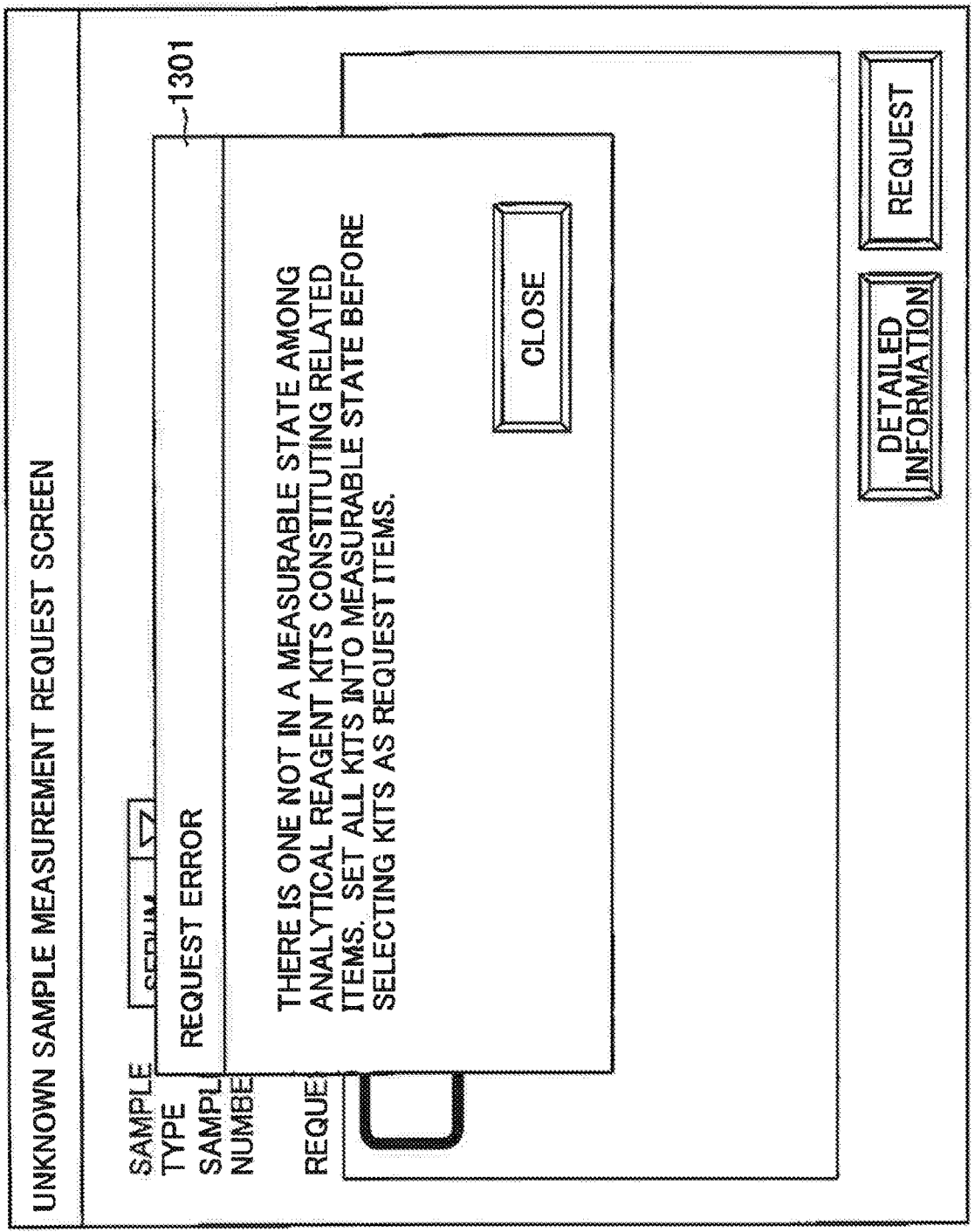
FIG. 13 shows an example of a screen for notifying a user of cancelling a request when at least one analysis item among a plurality of analysis items registered as the set item is not normally completed with up to the precision-management measurement on an unknown sample measurement request screen in the automatic analyzer to which the present invention is applied.

Furthermore, FIG. 13 shows a screen for notifying the user of cancelling a request on the unknown sample measurement request screen when at least one analysis item among the plurality of analysis items registered as the set item is not normally completed with up to the precision-management measurement. When the user requests a set item in a state in which at least one analysis item among the plurality of analysis items registered as the set item is not normally completed with up to the precision-management measurement, the screen for notifying the user to execute a request after all the analytical reagent kits that constitute the set item turn into an unknown sample measurable state is displayed as shown in a request error notification screen 1301. It is noted that the cancel of the request shown herein is also applicable to a case in which the automatic analyzer is connected to a host system and the host system executes an analysis request. In this case, the error notification screen is not displayed on the automatic analyzer but the automatic analyzer automatically cancels the request and then notifies the host system of an error. With such a screen, it is possible to avoid an error in the unknown sample measurement due to lack of completion of preparation for part of the analytical reagent kits that constitute the set item and save time and labor for the user to perform backtracking work.

Further, an example of applying management of the plurality of analytical reagent kits that constitute the set item in such a manner as to be associated with one another as presented by the present invention to management of the number of possible measurements of the analytical reagent kits will now be described with reference to FIGS. 14 and 15.

FIG. 14 shows an example of a registered analysis item list display screen when the number of possible measurements of one analytical reagent kit that constitutes the set item becomes one. Row 1402 shows that the number of possible measurements of one analytical reagent kit that constitutes the set item is one. In addition, row 1403 shows that the remaining number of possible measurements of another analytical reagent kit that constitutes the set item is two or more (50 in the present example). FIG. 15 shows an example of the registered analysis item list display screen when one more analysis is executed using the analytical reagent kit shown in row 1402 and the number of possible measurements of the analytical reagent kit becomes zero. Row 1502 shows that the number of possible measurements of one analytical reagent kit that constitutes the set item is decremented by one to zero. In this case, as shown in row 1503, the number of possible measurements of another analytical reagent kit that constitutes the set item as that of the set item is not 49 obtained by decrementing 50 by one but becomes zero. In other words, when one analytical reagent kit that constitutes the set item becomes empty, it is determined that another analytical reagent kit that constitutes the set item becomes empty as the analytical reagent kit for the set item. With such a screen, it is possible to avoid an error in the unknown sample measurement because the number of possible measurements of part of the analytical reagent kits that constitute the set item is zero, and save time and labor for the user to perform backtracking work.

DESCRIPTION OF REFERENCE CHARACTERS

101: Analysis section
102: Control section
103: Input section
104: Display section
111: Sample container
112: Sample container transport mechanism
113: Sample probe
114: Disposable tip attachment/detachment section
115: Disposable tip magazine
116: Reaction container magazine
117: Disposable tip/reaction container transport mechanism
118: Opening portion
119: Reaction container holding section
120: Analytical reagent kit
121: Measurement reagent disk
122: Reagent dispensing probe
123: Reagent probe washing section
124: Magnetic particle stirring mechanism
125: Magnetic particle stirring mechanism washing section
131: Detection section
132: Detection-section reaction container transport mechanism
201: Labeled antibody reagent container
202: Biotinylated antibody reagent container
203: Streptavidin bond magnetic particle reagent container
204: Analytical reagent label
301: Analytical reagent kit registration step
302: Calibration curve calibration step
303: Precision-management measurement step
304: Unknown sample measurement step
401: Analytical reagent kit mounting step
402: Set item registration determination step
403: Individual preliminary preparation operation execution step
404: Analytical reagent kit registration status determination step
405: Collective preliminary preparation operation execution step
406: Preliminary preparation operation non-execution step
501: Set item registration confirmation message display section
502: Set analytical reagent kit information display section
503: Set item registration button
504: Set item non-registration button
601: Analytical reagent kit status display list
602: Set item registration completion display example
603, 604: Set item registration non-completion display example
701: Calibration status display list
702: Set item calibration completion display example
703: Set item calibration time limit display example
801: Reagent disk information display section
802: Analytical reagent kit display section
803: Analytical reagent kit detailed information display screen
804: Analytical reagent kit general information display section
805: Calibration status display section
901: Precision-management measurement status display list
902: Set item precision-management measurement completion display example
903: Precision-management error criterion selection button
1001: Sample type input section
1002: Sample number input section
1003: Request item selection section
1004: Request enter button
1005, 1006, 1007, 1101: Selection item
1102: Detailed information display button
1201: Analysis item detailed information display screen
1201: Analysis item detailed information display example
1301: Request error notification screen
1401, 1501: Registered analysis item list display screen
1402, 1502, 1503: Analytical reagent kit number-of-possible-measurements display example

The invention claimed is:

1. An automatic analysis apparatus, comprising:
a plurality of analysis reagent kits, each analysis reagent kit of the plurality of analysis reagent kits comprises a plurality of containers, each container comprising a reagent, and an analysis reagent label on an outer side of one of the containers, wherein the label comprises analysis reagent kit information about each corresponding analysis reagent kit;
a reagent disk for mounting the plurality of analysis reagent kits;
a reaction disk;
a detector that detects a reaction between at least one reagent of one of the plurality of analysis reagent kits and an unknown specimen to be analyzed;
a display for displaying information to a user; and
a controller to perform registration, preliminary preparation, calibration, and quality control measurement steps for each of the plurality of analysis reagent kits, the controller programmed to:
determine whether each analysis reagent kit, of the plurality of analysis reagent kits, is to be registered as an individual item or a set item based on the analysis reagent kit information from the analytical reagent label of the corresponding analysis reagent kit of the plurality of analysis reagent kits, upon mounting each of the plurality of reagent kits,
execute preliminary preparation steps to each analysis reagent kit registered as an individual item, the preliminary preparation steps include a reagent capacity check and preliminary stirring of a reagent in each analysis reagent kit registered as an individual item, wherein each analysis reagent kit registered as an individual item represents an individual item that is used to individually measure an individual analysis item to obtain an individual analysis result,
determine whether each of the plurality of analysis reagent kits registered as a set item are all mounted on the reagent disk,
execute simultaneously preliminary preparation steps to each analysis reagent kit registered as a set item upon determining all the plurality of analysis reagent kits registered as a set item are all mounted on the reagent disk, the preliminary preparation steps include the reagent capacity check and preliminary stirring of a reagent in each analysis reagent kit registered as a set item, wherein the plurality of analysis reagent kits registered as a set item collectively represent one set item, each registered set item of the one set item is used to measure a set analysis item to collectively obtain data comprising a plurality of measurement results of the set analysis item, and wherein the data is used to obtain one set analysis result, determine whether a first calibration condition of a first calibration curve of at least one analysis reagent kit among the plurality of analysis reagent kits registered as a set item, and a second calibration condition of a second calibration curve of at least one analysis reagent kit of the plurality of reagent kits registered as an individual item, are the same, copy calibration results of the second calibration curve of at least one analysis reagent kit of the plurality of analysis reagent kits registered as an individual item, and apply the calibration results to the first calibration curve of at least one analysis reagent kit of the plurality of analysis reagent kits registered as a set item, upon determining the first calibration condition of a first calibration curve of at least one analysis reagent kit of the plurality of analysis reagent kits registered as a set item, and the second calibration condition of a second calibration curve of at least one analysis reagent kit of the plurality of analysis reagent kits registered as an individual item, are determined to be the same, determine whether a first quality control measurement condition of at least one analysis reagent kit of the plurality of analysis reagent kits registered as a set item, and a second quality control measurement condition of at least one analysis reagent kit of the plurality of analysis reagent kits registered as an individual item, are the same, and copy quality control measurement results of the at least one analysis reagent kit of the plurality of analysis reagent kits registered as an individual item, and apply the quality control measurement results to the at least one analysis reagent kit of the plurality of analysis reagent kits registered as a set item when the first quality control measurement condition of at least one analysis reagent kit of the plurality of analysis reagent kits registered as a set item, and the second quality control measurement condition of at least one analysis reagent kit of the plurality of analysis reagent kits registered as an individual item, are determined to be the same, wherein the display successively presents one or more lists of information about the plurality of analysis reagent kits registered as an individual item and a set item, during the registration, preliminary preparation, calibration, and quality control measurement steps on different screens of the display.

2. A method of an automatic analysis apparatus, comprising: providing the automatic analysis apparatus, the automatic analysis apparatus comprises: a plurality of analysis reagent kits, each analysis reagent kit of the plurality of analysis reagent kits comprises a plurality of containers, each container comprising a reagent, and an analysis reagent label on an outer side of one of the containers, wherein the label comprises analysis reagent kit information about each corresponding analysis reagent kit; a reagent disk for mounting the plurality of analysis kits; a reaction disk; a detector that detects a reaction between at least one reagent of one of the plurality of analysis reagent kits and an unknown specimen to be analyzed; a display for displaying information to a user; and a controller to perform registration, preliminary preparation, calibration, and quality control measurement steps for each of the plurality of analysis reagent kits, the controller performing the steps of:

determining whether a first analysis reagent kit, of the plurality of analysis reagent kits, is to be registered as an individual item or a set item based on the analysis reagent kit information from the analytical reagent label of the corresponding analysis reagent kit of the plurality of analysis reagent kits, upon mounting each of the plurality of reagent kits;

executing preliminary preparation steps to each analysis reagent kit registered as an individual item, the preliminary preparation steps include a reagent capacity check and preliminary stirring of a reagent in each analysis reagent kit registered as an individual item, wherein each analysis reagent kit registered as an individual item represents an individual item that is used to individually measure an individual analysis item to obtain an individual analysis result;

determining whether each of the plurality of analysis reagent kits registered as a set item are all mounted on the reagent disk;

executing simultaneously preliminary preparation steps to each analysis reagent kit registered as a set item upon determining all the plurality of analysis reagent kits registered as a set item are all mounted on the reagent disk, the preliminary preparation steps include the reagent capacity check and preliminary stirring of a reagent in each analysis reagent kit registered as a set item, wherein the plurality of analysis reagent kits registered as a set item collectively represent one set item, each registered set item of the one set item is used to measure a set analysis item to collectively obtain data comprising a plurality of measurement results of the set analysis item, and wherein the data is used to obtain one set analysis result;

determining whether a first calibration condition of a first calibration curve of at least one analysis reagent kits registered as a set item, and a second calibration condition of a second calibration curve of at least one analysis reagent kit of the plurality of analysis kits registered as an individual item, are the same, and copying calibration results of the second calibration curve of at least one analysis reagent kit of the plurality of analysis reagent kits registered as an individual item, and apply the calibration results to the first calibration curve of at least one analysis reagent kit of the plurality of analysis reagent kits registered as a set item, upon determining the first calibration condition of a first calibration curve of at least one analysis reagent kit of the plurality of analysis reagent kits registered as a set item, and the second calibration condition of a second calibration curve of at least one analysis reagent kit of the plurality of analysis reagent kits registered as an individual item, are determined to be the same;

determining whether a first quality control measurement condition of at least one analysis reagent kit of the plurality of analysis reagent kits registered as a set item, and a second quality control measurement condition of at least one analysis reagent kit of the plurality of analysis reagent kits registered as an individual item, are the same; and copying quality control measurement results of the at least one analysis reagent kit of the plurality of analysis reagent kits registered as an individual item, and apply the quality control measurement results to the at least one analysis reagent kit of the plurality of analysis reagent kits registered as a set item when the first quality control measurement condition of at least one analysis reagent kit of the plurality of analysis reagent kits registered as a set item, and the second quality control measurement condition of at least one analysis reagent kit of the plurality of analysis reagent kits registered as an individual item, are determined to be the same, wherein the display successively presents one or more lists of information about the plurality of analysis reagent kits registered as an individual item and a set item, during the registration, preliminary preparation, calibration, and quality control measurement steps on different screens of the display.

* * * * *